Jan. 3, 1967   R. C. FOUTCH ET AL   3,295,648

HUB AND SHAFT CONNECTION FOR CENTRIFUGAL CLUTCHES

Filed Feb. 1, 1965

INVENTOR.
ROY C. FOUTCH
SANFORD L. HARGROVE
BY

ATTORNEYS

United States Patent Office

3,295,648
Patented Jan. 3, 1967

3,295,648
HUB AND SHAFT CONNECTION FOR
CENTRIFUGAL CLUTCHES
Roy C. Foutch, 3300 W. 8th, Coffeyville, Kans. 67337, and Sanford L. Hargrove, 922 N. Santa Fe, Wichita, Kans. 67214
Filed Feb. 1, 1965, Ser. No. 429,424
2 Claims. (Cl. 192—105)

This invention relates to shaft connections, more particularly to shaft connections for transversely split elements mountable on a shaft. Still more specifically, this invention relates to improvements in shaft connections in which a split annular element is wedged securely between the element mounted on the shaft and the shaft. The shaft connection of the invention is particularly adaptable for use in centrifugal clutch assemblies.

There are many different known methods of mounting a pulley disc or clutch on a shaft. However, the known methods of mounting elements on such shafts have many shortcomings. In general, each of the known means of securing pulleys, clutches, etc., to shafts allows at least a small amount of play or looseness between the bore of the element being mounted and the shaft. This small amount of play or looseness allows the element to rock or-wobble relative to the shaft as it is rotated. After the unit has been in use for a prolonged period the rocking and wobbling causes wear to the shaft and the mounted element which allows rocking to a greater degree. As the element is allowed to rock to a greater degree the wear progresses at a faster rate causing vibration, serious damage to the element and the shaft. In many instances, particularly where high speed operation is necessary, the situation can become dangerous. This problem of wear is particularly serious in centrifugal clutch assemblies. The clutch hub, provided with clutch shoes mounted thereon, will often wear the shaft to such a degree that the unit utilizing the clutch assembly is rendered unserviceable. A common structural arrangement is a clutch mounted on the crank shaft of internal combustion engine as for example in a chain saw. The crank shaft is a relatively expensive item and the work entailed in replacing the crank shaft is quite extensive therefore it can be appreciated that a very troublesome situation exists.

We have invented a new connection means for mounting a split hub on a shaft. The connection means of our invention has a split bushing disposed on the shaft. The bushing is provided with outwardly tapered exterior surfaces. A means is provided to prevent relative movement between the bushing and the shaft. Tapered bores are provided in the sections of the split hub which are complementary in shape to the exterior surfaces on the bushing. Suitable means are provided for securing the sections of the split hub together in engagement with the bushing.

We have also invented a new centrifugal clutch assembly combination. The centrifugal clutch assembly combination of our invention includes a transversely split hub, friction elements mounted on the hub with tension means securing them to same, and a drum member having an internal cylindrically shaped surface positioned about the hub assembly. The improvement is a connection means for positively securing the split hub on a shaft. The connection means includes a longitudinally split bushing disposed on the shaft with outwardly tapered exterior surfaces on same, and a means to prevent relative movement between the bushing and the shaft. Tapered bores are provided in the split hub which are complementary in shape to the tapered exterior surfaces of the bushings. Means are also provided to secure the sections of the split hub together in engagement with the bushing.

The connection means and the centrifugal clutch assembly combination of our invention solves all of the problems associated with similar apparatus known to the prior art. The connection means of the invention will positively secure a hub or pulley, etc. to a shaft and eliminate all play and looseness therebetween. Since there is no looseness between the shaft and the element mounted thereon no wear will occur in use. The end effect is a more dependable trouble free unit. In the centrifugal clutch assembly apparatus of our invention the troublesome wear between the clutch hub and the shaft is eliminated. By eliminating this wear expensive repairs, breakdowns, and vibration are eliminated.

Further, our connection means are relatively simple and simple to install and simple to manufacture. There is less need for the maintenance of close tolerances between the various elements of the clutch assembly, or other hub element, and the shaft on which same are mounted. This materially reduces the production costs.

An object of this invention is to provide a new connection means.

Another object of the invention is to provide a new centrifugal clutch assembly combination having a new connection means embodied therein.

Still another object of the invention is to provide a new connection means for a hub and shaft which eliminates play and looseness therebetween.

Yet another object of the invention is to provide a connection means that is relatively simple to install.

Another object of the invention is to provide a new connection means that can be inexpensively manufactured and which does not require the maintenance of very close tolerances.

Other objects and advantages of the new connection means and centrifugal clutch assembly of our invention will become apparent to those skilled in the art upon reading the disclosure.

Drawings accompany and are a part of this disclosure. These drawings depict preferred new specific embodiments of the new connection means and clutch assembly, of our invention, and it is to be understood that such drawings are not to unduly limit the scope of the invention.

The following is a discussion and description of the new connection means and clutch assembly apparatus of our invention made with reference to the drawings wherein the same numerals are used to indicate the same and/or similar structure. The discussion and description is of preferred specific embodiments of the new connection means and clutch assembly of our invention. and it is to be understood that such is not to unduly limit the scope of our invention.

Figure 1:
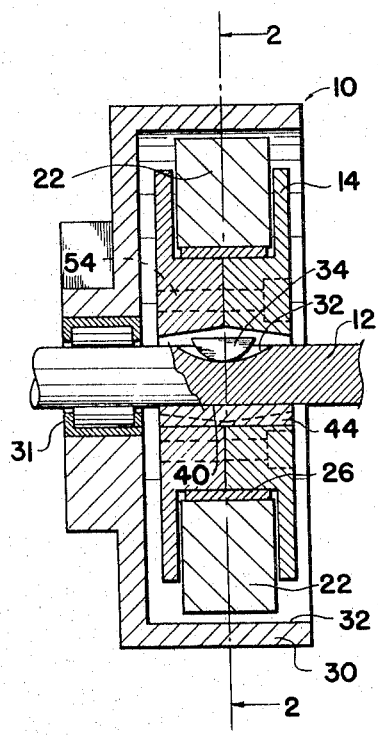
FIG. 1 is a side elevational view in cross section of a preferred specific embodiment of the new clutch assembly apparatus combination of the above invention, including the new connection means.
Figure 2:
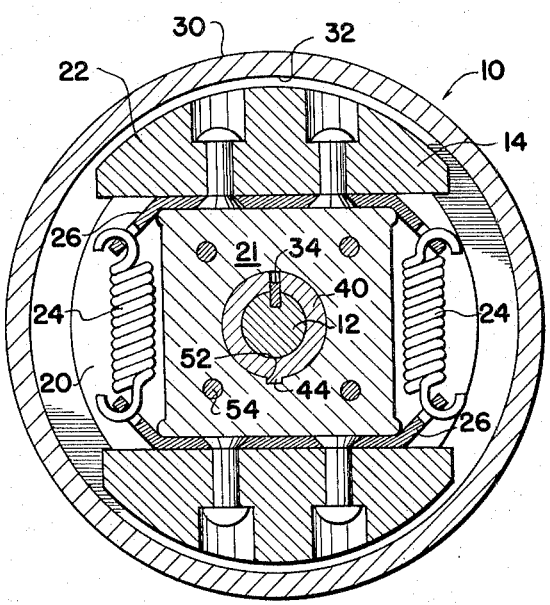
FIG. 2 is a front elevational view in cross section taken on line 2—2 of FIG. 1.
Figure 3:
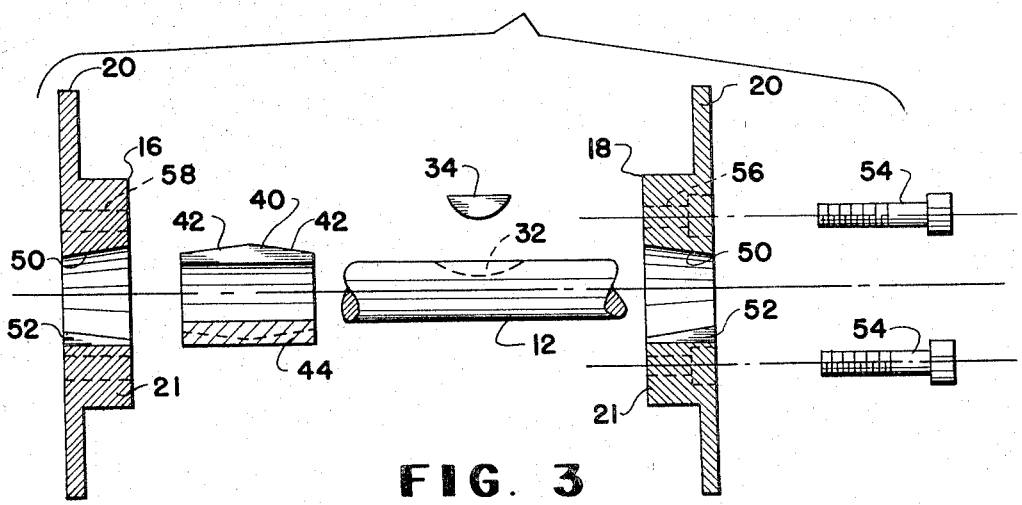
FIG. 3 is a side elevational view of the hub of our invention shown in exploded relation.

Referring now to the figures of the drawings, there is illustrated a preferred specific embodiment of the new centrifugal clutch apparatus 10 mounted on a shaft 12. The clutch 10 has a clutch hub assembly 14 mounted on shaft 12. Hub 14 is split into two elements 16 and 18, as more clearly illustrated in FIG. 3. Each of the hub elements has a disc-like flange 20 mounted on a generally square central portion 21 as indicated most clearly in FIG. 2. The hub 14 can be made of any suitable material, such as metal, plastic, fibrous material, etc. We have found that a plastic material sold under the trademark nylon works very well. Two semi-circular elements 22 are positioned on opposite sides of the central portion 21 of hub 14. Tension-type coil springs 24 are attached to base members 26, secured to the friction elements 22, to maintain same in operative relation on the hub 14. A drum member 30 having an interior cylindrically shaped surface 22 is positioned about the clutch hub assembly 14. The drum member 30 is mounted on a roller bearing 31, as indicated in FIG. 1. As can be appreciated, the centrifugal force when the shaft is rotated will throw the friction elements 22 outwardly into engagement with the drum 30 thereby causing it to rotate along with the hub. Thus, a driving connection is established between driving shaft 12 and drum 30.

The shaft 12 has a longitudinally extending semi-circular key seat 32 with a half-moon key 34 seated therein. An annular shaped split bushing 40 is disposed about shaft 12 with the half-moon key positioned between the ends of the bushing, as shown most clearly in FIG. 2. The bushing 40 has opposite outwardly tapered exterior surfaces 42, and an elongated longitudinally extending radially protruding key portion 44. The split hub 14, consisting of two hub elements 18 and 16, has aligned outwardly tapered bores 50 disposed in each element. A key seat 52 is also disposed in bores 50 of elements 16 and 18. The bores 50 in elements 16 and 18 are complementary in shape to the tapered surfaces 42 on bushing 40. The bushing 40 is received in bores 50 when the elements 16 and 18 are mounted in position on the shaft 12. Four bolts 54 secure the two sections 16 and 18 of the hub 14 into engagement with each other and the annular bushing 40 and the key 44. When the bolts are tightened, the hub elements 16 and 18 cam the split bushing 40 into very firm contact with the shaft 12. The bolts are disposed in suitable apertures 56 and 58 in the elements 16 and 18.

From the foregoing description and drawings it is apparent that the centrifugal clutch of our invention is adapted to provide a driving connection between the shaft and the drum with the connection means maintaining a secure and tight relationship between the shaft and the clutch hub. The tight connection means prevents wear and relative movement between the shaft and to the clutch hub. It is understood that the connection means of our invention can be used in other applications than in the clutch assembly described hereinbefore. For example, the connection means can be used in split pulleys, or any application where an element is secured to a shaft.

As will be obvious to those skilled in the art, various changes and modifications of the preferred clutch assembly and connection means thereof as described herein can be made or followed without departing from the spirit of the disclosure or the scope of the claims.

We claim:

1. In a centrifugal clutch having a clutch hub assembly mounted on a shaft, including a transversely split hub having a square central portion and spaced disc-like flanges, two semi-circular friction elements positioned on opposite sides of said central portion, and two tension-type coil springs attached to the ends of said friction elements securing same against said central portion, and a drum member having an interior cylindrically shaped surface positioned about said hub assembly, the improvement comprising, a connection means for rigidly securing said hub assembly on said shaft, said shaft having a longitudinally extending semi-circular shaped key seat, a half-moon key seated in said key seat, an annular shaped split bushing disposed about said shaft positioned with said half-moon key positioned between the ends thereof, said bushing having opposite outwardly tapered exterior surfaces, and an elongated longitudinally extending radially protruding key portion, said split hub comprised of two hub elements each having an outwardly tapered bore, and a key seat, said bores being complementary in shape to said tapered surfaces of said bushing and receiving said bushing therein, four bolts securing said hub elements in assembled relation, said centrifugal clutch adapted in use to provide a driving connection between said shaft and said drum with said connection means maintaining a rigid relationship between said shaft and said hub assembly preventing wear and vibration.

2. In a centrifugal clutch having a clutch hub assembly mounted on a shaft, including a transversely split hub, two semi-circular friction elements positioned on said hub, and resilient means securing said friction elements to said hub, the improvement comprising, a connection means for rigidly securing said hub assembly on said shaft, said shaft having a longitudinally extending key seat, a key seated in said seat, a split bushing disposed about said shaft positioned with said key between the ends thereof, said bushing having opposite outwardly tapered exterior surfaces, and an elongated longitudinally extending radially protruding key portion, said split hub comprised of two hub elements, each having an outwardly tapered bore, and a key slot, said bores being complementary in shape to said tapered surfaces of said bushing, and receiving said bushing therein, means securing said hub elements in assembled relation, said clutch adapted in use to maintain a rigid relationship between said hub and said shaft and prevent wear and vibration.

References Cited by the Examiner

UNITED STATES PATENTS

| | | | |
|---|---|---|---|
| 234,343 | 11/1880 | Stedman | 287—52.06 X |
| 2,082,969 | 6/1937 | Myers | 192—68 |
| 2,407,032 | 9/1946 | Myers | 192—68 |
| 2,524,027 | 10/1950 | Blackmarr | 287—52.06 |
| 3,043,613 | 7/1962 | Papageorges | 287—52.06 |
| 3,101,625 | 8/1963 | Horrath | 192—105 X |
| 3,122,384 | 2/1964 | Luenberger | 287—52.04 |

DAVID J. WILLIAMOWSKY, *Primary Examiner.*

BENJAMIN W. WYCHE, *Examiner.*